UNITED STATES PATENT OFFICE.

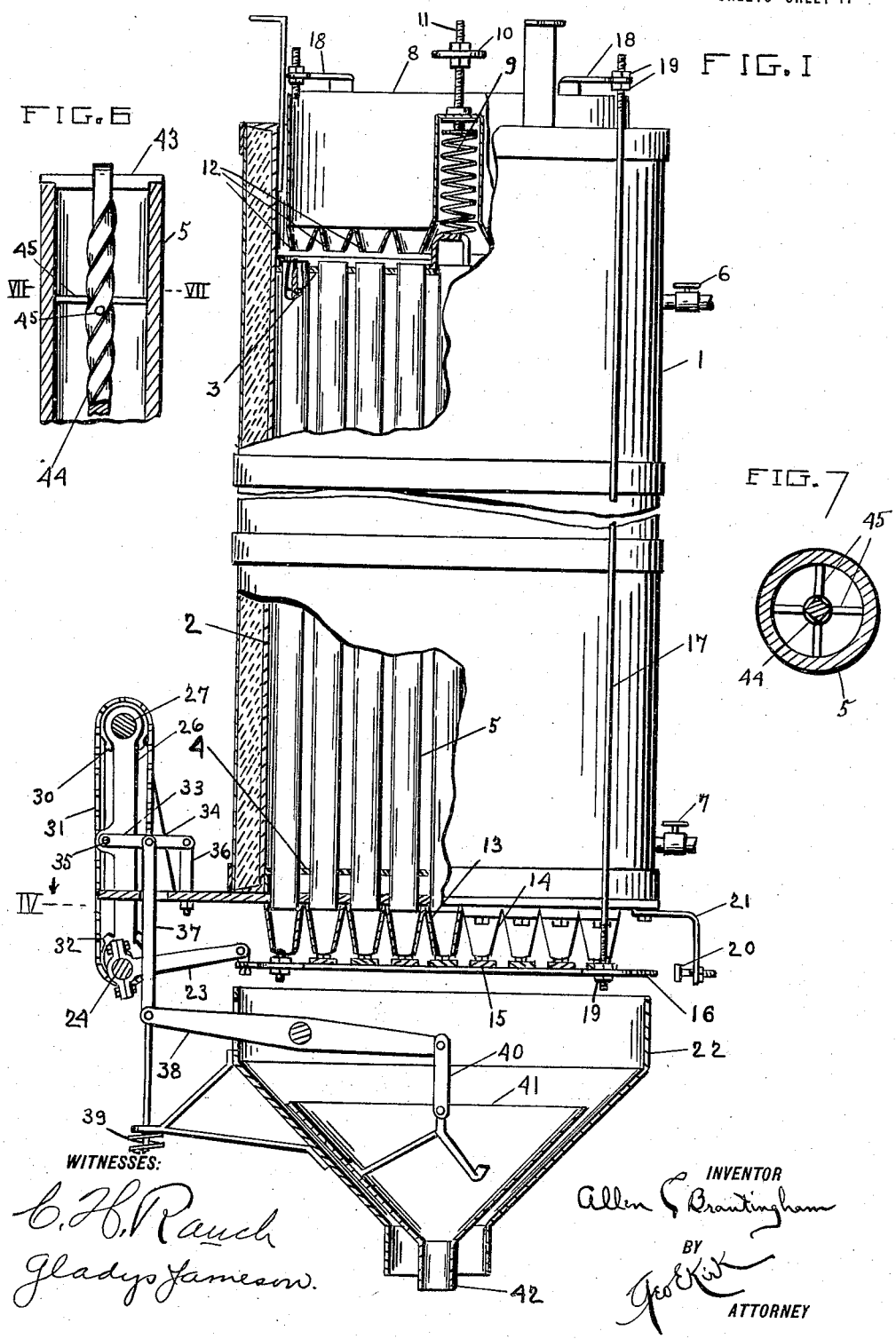

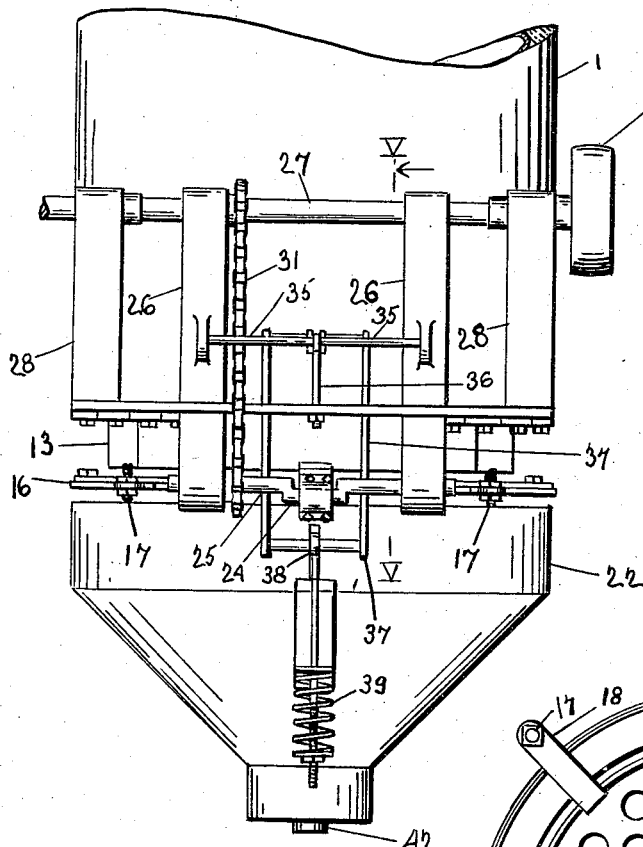
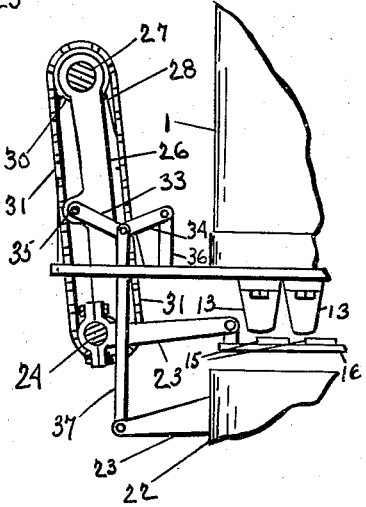
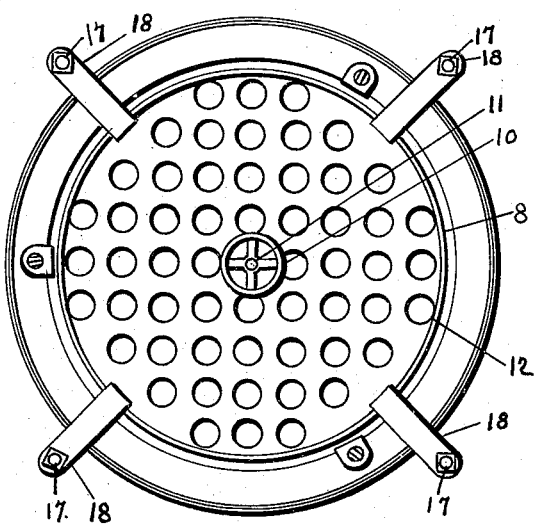
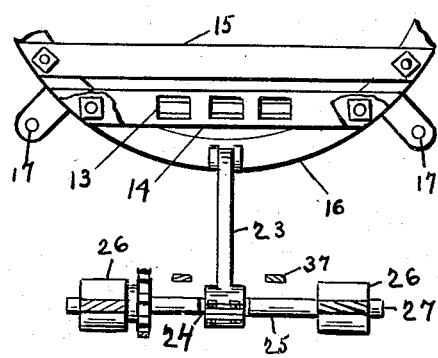

ALLEN C. BRANTINGHAM, OF TOLEDO, OHIO, ASSIGNOR TO C. G. HAMMOND, TRUSTEE, OF SILVER CREEK, NEW YORK.

HEATER CONTROL DEVICE.

1,161,835. Specification of Letters Patent. Patented Nov. 30, 1915.

Application filed January 26, 1914. Serial No. 814,328.

*To all whom it may concern:*

Be it known that I, ALLEN C. BRANTINGHAM, a citizen of the United States, residing at Toledo, Lucas county, Ohio, have invented a new and useful Heater Control Device, of which the following is a specification.

This invention relates to mechanism for caring for a flow of material to be treated.

This invention has utility when embodied in heaters for grain, as in preparing wheat for milling.

Referring to the drawings: Figure 1 is a side elevation with parts broken away of an embodiment of the invention in a treating device or grain heater; Fig. 2 is a fragmentary side elevation from the left of the showing in Fig. 1; Fig. 3 is a plan view of the device of Fig. 1; Fig. 4 is a section on the line IV—IV Fig. 1, looking in the direction of the arrow; Fig. 5 is a section on the line V—V Fig. 2, looking in the direction of the arrow, the parts being in dump position; Fig. 6 is a fragmentary section through one of the ways showing the baffle therefor; and Fig. 7 is a section on the line VII—VII Fig. 6.

The jacketed heater or treating device 1 comprises cylindrical drum member 2 having the heads or end diaphragms 3, 4 connected by the ways or tubes 5. There is accordingly provided between the ways 5, the drums 2, and the diaphragms 3, 4, a chamber for a heating medium, as steam, the supply of which may be controlled by the valve 6, while the condensation discharge may be controlled by the outlet valve 7.

In the use of the device as a grain heater, it may be mounted in a mill to receive a stream of say wheat in the upper hopper or basket 8 poised by spring 9 as adjusted in position by the hand wheel 10 on the rod 11. The hopper 8 is provided with openings 12 registering with the ways 5 to discharge material supplied to the hopper 8 into said ways, that it may travel in its intermittent flow to the fixed registering hoppers 13, in the series 14 disposed above the slats 15 carried by the platform 16 suspended by rods 17 from the brackets 18 of the hopper 8. Nuts 19 permit any desired adjustment for the platform 16 as to the rigid hopper series 14. The platform 16 as thus suspended is free to travel and has its limit determined by the adjustable stop 20 carried by the bracket 21 on the heater 1. This platform 16 may be actuated to move the slats 15 back and forth below the hoppers 13 to permit flow of material from the hoppers 13 or to crowd material off the slats 15 and thereby control material flow through the heater 1 into the discharge hopper 22. The platform 16 is actuated by the link 23 mounted on the crank 24 of the shaft 25 suspended by the brackets 26 from the shaft 27 carried by the brackets 28 mounted on the heater 1. The shaft 27 may be continuously driven by the belt wheel 29 in connection with the driving power of the mill.

Fast on the shaft 27 is the sprocket wheel 30 carrying the sprocket chain 31 passing over the sprocket wheel 32 on the shaft 25. Accordingly the shaft 25 may be continuously driven to reciprocate the platform 16 through the operation of the link 23. The spill or flow extent of this reciprocation control is modified by the distance of the slats 15 from the hoppers 13. As the hopper 8 fills the platform 16 is moved down from the hoppers 13 and greater spill rate is permitted. As there is recovery in reducing the volume of material in the hopper 8, the hopper 8 automatically rises as actuated by the spring 9 to reduce the distance between the hoppers 13 and the slats 15 and with this distance reduced the reciprocation of the slats 15 as effected by the link 23 gives a reduction in the discharge of material in its intermittent flow through the heater 1. Toggle links 33, 34, extend from the bar 35 connecting the brackets 26, to the fixed bracket 36. This toggle 33, 34, may be broken by the link 37 as actuated by the lever 38 against the resistance of the spring 39. This spring 39 is adjusted to normally counteract the weight of material flow carried by the link 40 in the auxiliary hopper 41 suspended from the lever 38. This hopper 41 has an opening 42 so that should material flow past the platform 16 cease, this auxiliary hopper 41 will empty and when emptied the spring 39 may act to draw down the link 37, throw the toggle 33, 34, and thereby cause the link 23 to force the platform 16 toward the stop 20 to move the slats 15 into such relation as to the hoppers 13 that any material in the heater 1 may be discharged therefrom. This feature is a feature of considerable value as it positively precludes overheating of grain in the stoppage of the mill for any cause as with the continuous driver 29 inoperative, the crowding or spilling of material past the slats 15 may cease, should this stoppage be with the slats in registering relation with the hopper 13. With the material thus held in the heater 1 the auxiliary hopper 41 acts as an automatic dump device for emptying the heater.

For rolling the grain about and better insuring a uniform heating thereof in working the intermittent flow of material against the heated walls of the ways 5, there is suspended in each way 5 by means of the cross arm 43, baffle 44 of twisted rod form. Concrete reinforcing bars have been found to answer this purpose very nicely. These rigid spiral ribbed reinforcing bars are positively held in centering position by the centering means or pins 45.

In operation the stream of material is received in the hopper 8, passes through the openings 12 therein to the ways 5 where it is rolled against the ways for thorough heating by the spirally ribbed baffle 44 during the intermittent travel of the grain therethrough. This intermittent travel is effected by the slats 15 below the hoppers 13 into which the respective ways 5 discharge. The slats 15 are movable transversely of the hoppers 13 to crowd material off the slats 15 or permit of flowing past the slats 15 through the slots between said slats. The reciprocation of the platform is effected through the link 23 and accordingly varies the flow of material by clogging to an extent the discharge from the hoppers 13. The volume of this discharge is automatically varied by the accumulation of the material in the hopper 8, which, through the rods 17 supporting the platform 16 increases the distance between the hoppers 13 and the slats 15, thereby automatically and directly varying the flow volume. Should the device stop at any time, the dump is effective in that leakage from the opening 42 in the auxiliary hopper 41 will allow the spring 39 to operate as a dumping trip for shifting the slats sufficiently far to allow any material retained in the heater 1 to be discharged therefrom. Upon the starting up of the mill accumulation of material in the auxiliary hopper 41 will automatically set the driving device for the slats 15 and thereby bring the hopper control device into normal running condition.

What is claimed and it is desired to secure by Letters Patent is:

1. A device for treating material embodying controlling means for material flow including a movable member thereabove for receiving the material to be treated by the device, and a centrally disposed spring for the member.

2. A device for treating material embodying controlling means for material flow including a movable member thereabove for receiving the material to be treated by the device, a centrally disposed spring for the member, and adjusting means for the spring.

3. A device for treating material embodying a way therethrough, and controlling means for material flow including a platform member below the way movable toward and from the way, said platform provided with an opening permitting material flow from the way and material flow actuated means for shifting the member.

4. A device for treating material embodying a plurality of ways therethrough, and controlling means for material flow including a platform member reciprocable transversely of the ways and additionally movable toward and from the ways.

5. A device for treating material embodying a way therethrough, and controlling means for material flow including a reciprocable member, and connecting the means for varying the distance of the reciprocable member from said way.

6. A device for treating material embodying a way therethrough, and controlling means for material flow including a reciprocable member, and material flow controlled actuating means for varying the distance of the reciprocable member from said way.

7. A device for treating material embodying a way therethrough, and controlling means for material flow including a member below the way movable toward and from the way, and automatic dump for the device.

8. A device for treating material embodying a way therethrough, and controlling means for material flow including a member below the way movable toward and from the way, and automatic dump means for moving the member to empty the device.

9. A device for treating material embodying a plurality of ways therethrough and controlling means for material flow including a reciprocable member and material flow adjusted suspension means for varying the distance of the reciprocable member from said ways.

10. A treating device baffle embodying a way, a spiral ribbed rod of uniform cross section and centering means for the rod in the way, said ribs being equally spaced.

11. A treating device embodying a way, a ribbed bar and centering means for the bar in the way, said bar being a regular polygon in cross section.

12. A grain heater embodying a plurality of parallel ways, a hopper thereover a platform therebelow, yieldable support for the hopper, and connections from the hopper to carry the platform whereby variation in the load in the hopper may change the distance of the hopper from the ways to automatically control the flow of grain through the heater.

In witness whereof I hereunto set my hand in the presence of two witnesses.

ALLEN C. BRANTINGHAM.

Witnesses:
 GEO. E. KIRK,
 GLADYS JAMESON.

Copies of this patent may be obtained for five cents each, by addressing the "Commissioner of Patents, Washington, D. C."

Correction in Letters Patent No. 1,161,835.

It is hereby certified that in Letters Patent No. 1,161,835, granted November 30, 1915, upon the application of Allen C. Brantingham, of Toledo, Ohio, for an improvement in "Heater Control Devices," an error appears in the printed specification requiring correction as follows: Page 2, line 111, claim 7, after the word "dump" insert the word *means;* and that the said Letters Patent should be read with this correction therein that the same may conform to the record of the case in the Patent Office.

Signed and sealed this 18th day of January, A. D., 1916.

[SEAL.]

Cl. 34—34.

J. T. NEWTON,
*Acting Commissioner of Patents.*